F. B. CLARK.
FILTERING CUP.
APPLICATION FILED OCT. 17, 1914.
1,137,462.
Patented Apr. 27, 1915.
2 SHEETS—SHEET 1.
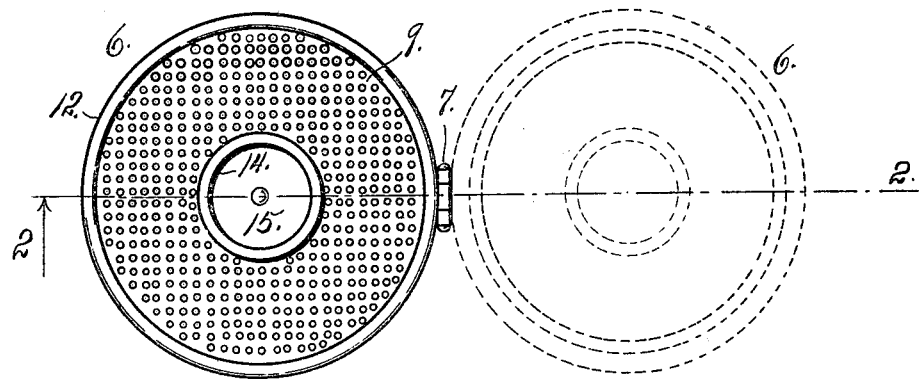
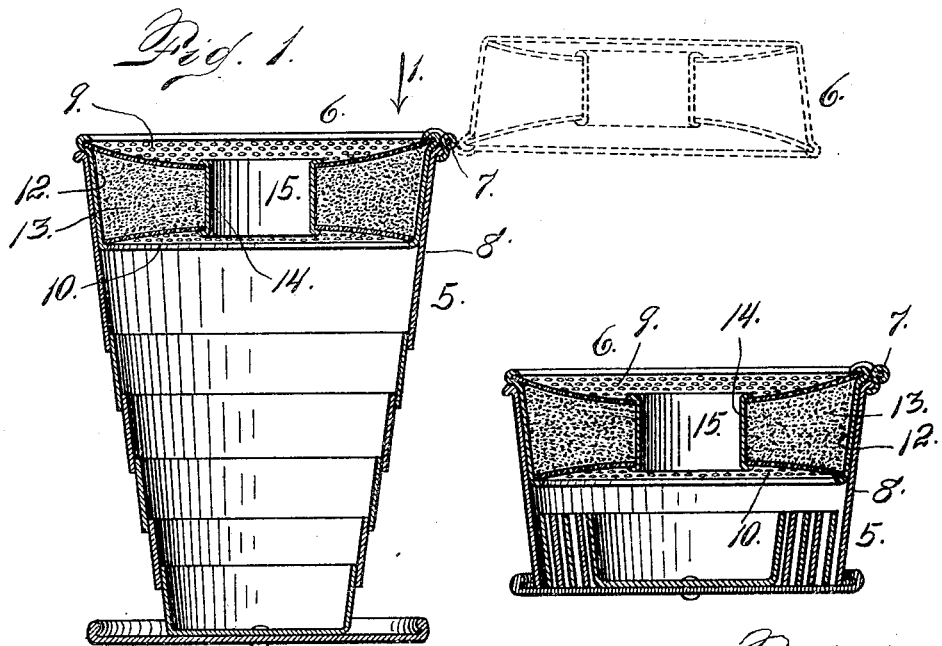

F. B. CLARK.
FILTERING CUP.
APPLICATION FILED OCT. 17, 1914.
1,137,462.
Patented Apr. 27, 1915.
2 SHEETS—SHEET 2.
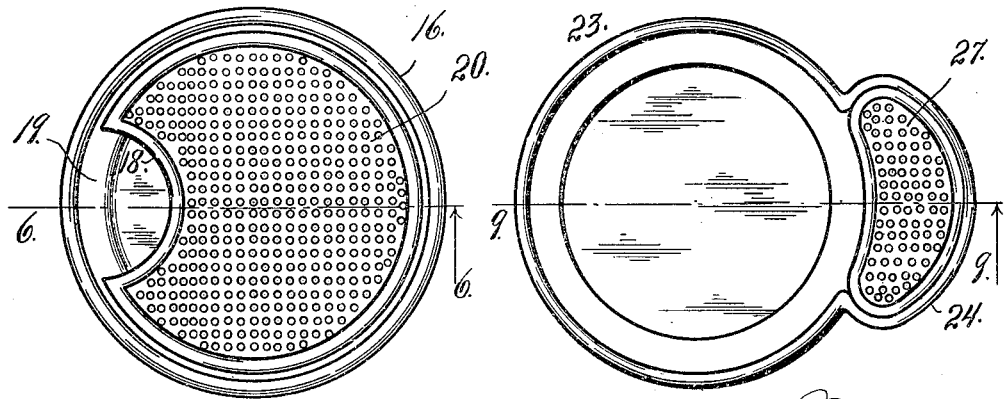
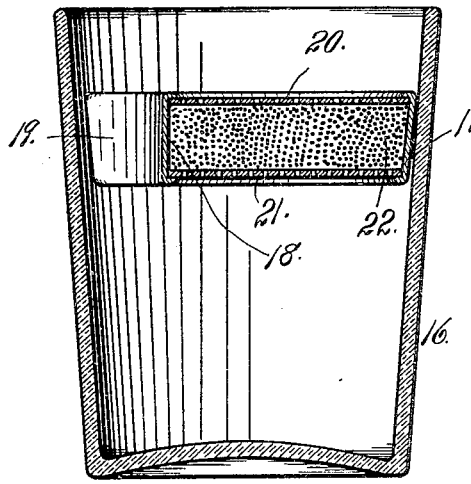
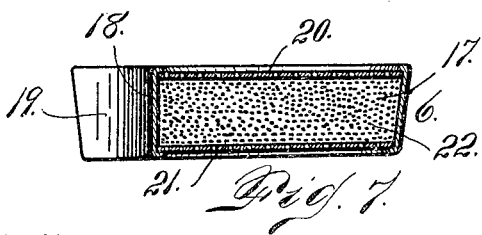
Inventor
F. B. Clark.

UNITED STATES PATENT OFFICE.

FRED B. CLARK, OF DENVER, COLORADO.

FILTERING-CUP.

1,137,462.              Specification of Letters Patent.      Patented Apr. 27, 1915.

Application filed October 17, 1914. Serial No. 867,209.

*To all whom it may concern:*

Be it known that I, FRED B. CLARK, a citizen of the United States, residing in the city and county of Denver and State of Colorado, have invented certain new and useful Improvements in Filtering-Cups; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in filtering receptacles, preferably of the drinking cup form.

As illustrated in the drawing, my improvement consists of a drinking cup to the top of which a filter is applied of such magnitude as to thoroughly cleanse the water as it passes from the cup to the mouth of the user. The filter attachment for the cup may consist of various forms. For instance, in the preferred form, the filter is hinged to one edge of the cup and may be thrown outwardly and away from the top of the cup when it is desired to wash or cleanse the latter. In other forms of my improvement, the filter may be formed separate from the cup and may be dropped into a drinking receptacle of any description, as a glass. Again, in another form of the device, the cup is provided with an offset mouth piece adapted to receive a relatively small filter which is dropped thereinto and will maintain its position.

As illustrated in the drawing, the filter attachment is composed of two perforated plates between which is placed the filtering material, as charcoal, or a combination of charcoal and such other material as may be deemed efficacious or desirable for this purpose.

Having briefly outlined my improved construction, I will proceed to describe the same in detail, reference being made to the accompanying drawing, in which is illustrated an embodiment thereof.

In this drawing, Figure 1 is a top plan view of a cup equipped with my improved filter attachment. Fig. 2 is a section taken on the line 2—2, Fig. 1, looking downwardly. Fig. 3 is a view similar to Fig. 1, but showing the cup in the collapsed form and with the filter in the full line position only. Fig. 4 is a detail view of a filter adapted to be dropped into a cup or glass of any ordinary design. Fig. 5 is a top plan view of a glass with a filter of still another form placed therein. Fig. 6 is a vertical section of the same taken on the line 6—6, Fig. 5. Fig. 7 is a sectional view in detail of the form of filter shown in Figs. 5 and 6. Fig. 8 is a top plan view of a special construction of drinking cup having an offset mouth piece in which a filter is placed. Fig. 9 is a section taken on the line 9—9, Fig. 8. Fig. 10 is a sectional detail view of the form of filter shown in Figs. 8 and 9.

The same reference characters indicate the same parts in all the views.

Referring first to Figs. 1 to 4, inclusive, let the numeral 5 designate a collapsible drinking cup of any ordinary or suitable construction. In Figs. 1 to 3, inclusive, a filter 6 is hinged as shown at 7, to the upper edge of the uppermost section 8 of this cup. This filter includes an outer wall 12 to which are attached top and bottom perforated plates 9 and 10, which are suitably spaced and between which is located a quantity of filtering material 13 which may be a combination of charcoal and any other material which may form a good filter for use in this connection. In the centers of the top and bottom plates 9 and 10 are formed relatively large openings in which is inserted a sleeve or tube 14 which constitutes an inner vertically disposed wall of the filter. The upper and lower extremities of this wall are bent outwardly and tightly secured to the perforated members 9 and 10, the latter being slightly dished, the one downwardly and the other upwardly. The outer wall 12 of this filter is preferably slightly beveled in order to fit within the upper part of the uppermost section 8 of the collapsible cup. It is evident, however, that this wall may be made vertical or any other shape that may be desired, in order to harmonize with the inner contour of the drinking receptacle with which it is intended to be used. The relatively large opening 15 which is surrounded by the wall 14, constitutes a filler opening or an opening through which the cup may be filled. For instance, this opening is large enough to receive the discharge extremity of the ordinary faucet connected with receptacles for water, which are located in railway cars and other public places. It is evident that this opening may be used to fill the cup from any source of water supply, even where it is desired to dip the cup into the water. In this form of the device, assuming that the cup is filled with water, the user may drink from the edge thereof by tilting the cup. In this event, the water will flow freely through the filter on the side of the cup where the mouth is placed. The quantity of filtering material is sufficient to thoroughly perform the filtering function. By virtue of this form of construction, any traveler may have not only an individual drinking cup in his possession, but also a filter attachment therefor which makes it impossible for him to drink disease germs which may be contained in water which he is obliged to use. As shown in Figs. 1, 2 and 3 of the drawing, this filter attachment readily collapses within the upper section of the drinking cup, and does not materially increase the space occupied by the cup when in the collapsed position (see Fig. 3).

In the form of construction shown in Figs. 5, 6 and 7, the filter 6 is formed separately from the glass or other receptacle 16, with which it is desired to employ it. In this case, the filter is composed of an outer wall 17 which is inwardly offset as shown at 18, leaving an open recess 19 at one side of the filter. Secured to the outer wall 17 at the top and bottom are perforated plates 20 and 21, which are suitably spaced to receive a suitable filter material 22. In this form of construction, the filter may be dropped into an ordinary glass (see Fig. 6) and the glass below the filter may be filled through the opening 19. In drinking from the glass, the latter will be tilted so that the water as it passes to the mouth of the user must pass through the filter.

In the form of construction shown in Figs. 8, 9 and 10, the wall of a cup 23 is offset at the top, as shown at 24, forming a mouth piece in which is inserted a filter 25 consisting of an outer wall 26, a top perforated member 27, and an upright perforated member 28. In this form of construction, the filter is located entirely beyond the body of the drinking receptacle, whereby the upper extremity of the latter is entirely open, the same as an ordinary device which is not equipped with a filter. In the use of this form of the device, the mouth is applied to the mouth piece 9 and the cup is tilted in such a direction as to cause the water to flow through the filter 25 to the mouth.

From the foregoing description, it will be understood that many different forms of my improvement may be used. In the drawing, I have endeavored to illustrate a sufficient number of forms to clearly indicate the possibilities as well as the efficiency of the invention.

In order to clean the filter, it will only be necessary to cause water to pass through it in the reverse direction from that which it takes during the act of drinking. Hence, in cleaning any form of the filter, water may be delivered to the upper perforated plate whereby it will pass downwardly and out through the opposite plate, or that through which it first enters the filter during the drinking act. In this manner, the filter may be quickly cleansed from impurities that may be collected in or be caught by the filtering substance during the regular use of the device.

Having thus described my invention, what I claim is,—

1. A filtering receptacle comprising in combination with the receptacle, a filter applied to the upper part thereof and including a quantity of filtering material, the filter having an opening through which the receptacle may receive liquid when the filter is in position.

2. A filter cup comprising in combination with the cup, a filter composed of two perforated walls and an interposed quantity of filtering material, the filter being arranged to fit within the upper part of the cup and hingedly connected with one edge thereof.

3. A filtering cup comprising in combination with the cup, a filter composed of two perforated walls and an interposed quantity of filtering material, the filter being arranged to fit within the top of the cup and having an opening through which the cup may receive liquid.

4. A combination with a cup, of a filter applied to the upper portion thereof, the filtering part having an opening therethrough independent of the filter openings themselves, and through which independent opening the cup may receive liquid.

In testimony whereof I affix my signature in presence of two witnesses.

FRED B. CLARK.

Witnesses:
 MAZE KIRBY,
 A. EBERT O'BRIEN.

Copies of this patent may be obtained for five cents each, by addressing the "Commissioner of Patents, Washington, D. C."